(12) United States Patent
Brown et al.

(10) Patent No.: US 9,489,310 B2
(45) Date of Patent: Nov. 8, 2016

(54) SYSTEM, METHOD AND COMPUTER-READABLE MEDIUM FOR SPOOL CACHE MANAGEMENT

(71) Applicant: TERADATA US, INC., Dayton, OH (US)

(72) Inventors: Douglas Brown, Rancho Santa Fe, CA (US); John Mark Morris, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 0 days.

(21) Appl. No.: 14/075,168

(22) Filed: Nov. 8, 2013

(65) Prior Publication Data

US 2014/0181406 A1    Jun. 26, 2014

Related U.S. Application Data

(63) Continuation of application No. 12/263,516, filed on Nov. 3, 2008, now Pat. No. 8,601,213.

(51) Int. Cl.
*G06F 12/12*     (2016.01)
*G06F 12/08*     (2016.01)
*G06F 17/30*     (2006.01)

(52) U.S. Cl.
CPC ....... *G06F 12/0868* (2013.01); *G06F 12/0891* (2013.01); *G06F 17/3048* (2013.01); *G06F 2212/263* (2013.01); *G06F 2212/465* (2013.01)

(58) Field of Classification Search
None
See application file for complete search history.

(56) References Cited

U.S. PATENT DOCUMENTS

| | | | | |
|---|---|---|---|---|
| 6,742,084 B1 * | 5/2004 | Defouw et al. | ............... | 711/133 |
| 6,842,826 B1 * | 1/2005 | McNutt | ......................... | 711/136 |
| 6,922,754 B2 * | 7/2005 | Liu et al. | ...................... | 711/138 |

* cited by examiner

*Primary Examiner* — Christian P Chace
*Assistant Examiner* — Eric Loonan
(74) *Attorney, Agent, or Firm* — Ramin Mahboubian (57) ABSTRACT

A system, method, and computer-readable medium that facilitate efficient use of cache memory in a massively parallel processing system are provided. A residency time of a data block to be stored in cache memory or a disk drive is estimated. A metric is calculated for the data block as a function of the residency time. The metric may further be calculated as a function of the data block size. One or more data blocks stored in cache memory are evaluated by comparing a respective metric of the one or more data blocks with the metric of the data block to be stored. A determination is then made to either store the data block on the disk drive or flush the one or more data blocks from the cache memory and store the data block in the cache memory. In this manner, the cache memory may be more efficiently utilized by storing smaller data blocks with lesser residency times by flushing larger data blocks with significant residency times from the cache memory. The disclosed cache management mechanisms are effective for many workloads and are adaptable to various database usage scenarios without requiring detailed studies of the particular data demographics and workload.

19 Claims, 6 Drawing Sheets

SQL Request

Figure 3

Executable Steps

SYSTEM, METHOD AND COMPUTER-READABLE MEDIUM FOR SPOOL CACHE MANAGEMENT

CROSS-REFERENCE TO RELATED APPLICATION

This application is a Continuation of and take priority from the U.S. Pat. No. 8,601,213, entitled: "SYSTEM, METHOD, AND COMPUTER-READABLE MEDIUM FOR SPOOL CACHE MANAGEMENT," filed on Nov. 3, 2008, which is hereby incorporated by reference herein in its entirety and for all purposes.

BACKGROUND

A database is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

One of the goals of a database management system is to optimize the performance of queries for access and manipulation of data stored in the database. In massively parallel processing (MPP) systems, caching of database objects in memory is a well known technique for improving performance by reducing the need for disk input/output (JO). As central processing units (CPUs) have become more powerful at a rate that far out paces disk performance improvements, it is important to maximize the use of cache as a method for maintaining system balance. Cache memory for a database system is a precious resource. The price per byte of cache memory is often two orders of magnitude higher than that of disk space. Hence, it is not uncommon to find cache ratios on the order of 0.1% to 1% of customer data space on disk.

Database systems may use spool space to temporarily store intermediate results of, for example, SQL requests. Some database management systems provide workload management features that automatically recognize and respond to exceptions including those related to spool space. Although such automation is a great benefit to database administrators, actions are still substantially limited in the management and performance of spool cache reads and writes. Spool space usage is a direct result of the characteristics of the execution plans chosen by the Query Optimizer.

Disadvantageously, contemporary systems are incapable of directly involving the Query Optimizer in responding to runtime spool cache management. In fact, the Optimizer is wholly uninvolved in runtime spool space management in most systems.

SUMMARY

Disclosed embodiments provide a system, method, and computer readable medium for efficient use of cache memory in a massively parallel processing system. The disclosed cache management mechanisms are effective for many workloads and are adaptable to various database usage scenarios without requiring detailed studies of the particular data demographics and workload.

A residency time of a data block to be stored in cache memory or a disk drive is estimated. A metric is calculated for the data block as a function of the residency time. The metric may further be calculated as a function of the data block size. One or more data blocks stored in cache memory are evaluated by comparing a respective metric of the one or more data blocks with the metric of the data block to be stored. A determination is then made to either store the data block on the disk drive or flush the one or more data blocks from the cache memory and store the data block in the cache memory. In this manner, the cache memory may be more efficiently utilized by storing smaller data blocks with lesser residency times by flushing larger data blocks with significant residency times from the cache memory.

BRIEF DESCRIPTION OF THE DRAWINGS

Aspects of the present disclosure are best understood from the following detailed description when read with the accompanying figures, in which.

DETAILED DESCRIPTION

It is to be understood that the following disclosure provides many different embodiments or examples for implementing different features of various embodiments. Specific examples of components and arrangements are described below to simplify the present disclosure. These are, of course, merely examples and are not intended to be limiting.

In accordance with disclosed embodiments, a system, method, and computer-readable medium for efficient use of cache memory in a massively parallel processing system are provided. The disclosed cache management mechanisms are effective for many workloads and are adaptable to various database usage scenarios without requiring detailed studies of the particular data demographics and workload.

Figure 1:
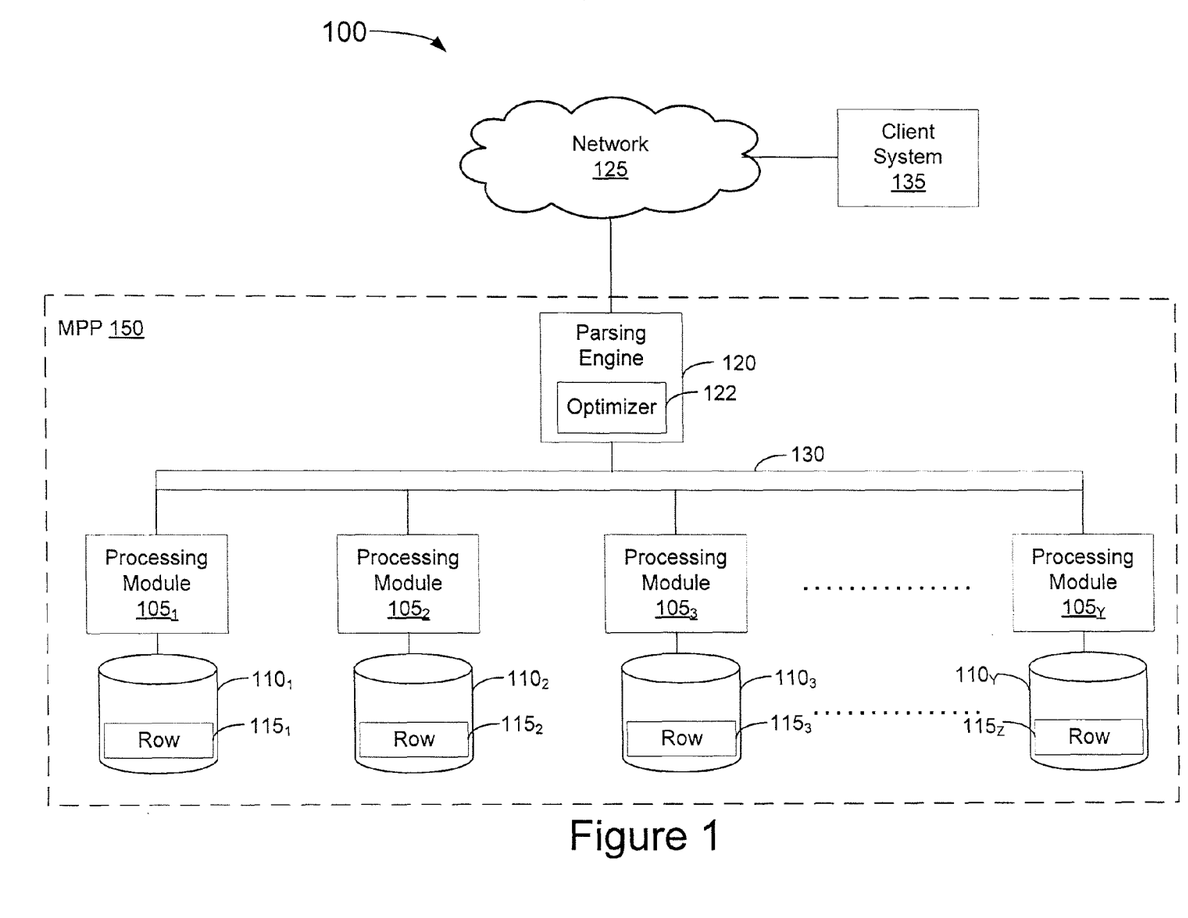
FIG. 1 depicts a diagrammatic representation of an exemplary architecture for a large database system that is suited for implementing a cache management mechanism implemented in accordance with disclosed embodiments.

FIG. 1 depicts a diagrammatic representation of an exemplary architecture for a large database system 100, such as a Teradata Active Data Warehousing System, that is suited for implementing a cache management mechanism implemented in accordance with disclosed embodiments. The database system 100 includes a relational database management system (RDBMS) built upon a massively parallel processing (MPP) system 150. Other types of database systems, such as object-relational database management systems (ORDBMS) or those built on symmetric multi-processing (SMP) platforms, are also suited for use, and the depicted and described architecture is exemplary only and is chosen to facilitate an understanding of the disclosed embodiments.

As shown, the database system 100 includes one or more processing modules $105_1 \ldots _Y$ that manage the storage and retrieval of data in data-storage facilities $110_1 \ldots _Y$. Each of the processing modules may host one or more access module processors (AMPs), e.g., virtual processors. Each of the processing modules $105_1 \ldots _Y$ manages a portion of a database that is stored in a corresponding one or more of the data-storage facilities $110_1 \ldots _Y$. Each of the data-storage facilities $110_1 \ldots _Y$ includes one or more disk drives or other storage medium.

The system stores data in one or more tables in the data-storage facilities $110_1 \ldots _Y$. The rows $115_1 \ldots _Z$ of the tables are stored across multiple data-storage facilities $110_1 \ldots _Y$ to ensure that the system workload is distributed evenly across the processing modules $105_1 \ldots _Y$. A parsing engine 120 organizes the storage of data and the distribution of table rows $115_1 \ldots _Z$ among the processing modules $105_1 \ldots _Y$ and accesses processing modules $105_1 \ldots _Y$ via an interconnect 130. The parsing engine 120 also coordinates the retrieval of data from the data-storage facilities $110_1 \ldots _Y$ in response to queries received from a user, such as one using a client computer system 135 connected to the database system 100 through a network connection 125. The parsing engine 120, on receiving an incoming database query, applies an optimizer 122 component to the query to assess the best plan for execution of the query. Selecting the optimal query-execution plan includes, among other things, identifying which of the processing modules $105_1 \ldots _Y$ are involved in executing the query and which database tables are involved in the query, as well as choosing which data-manipulation techniques will serve best in satisfying the conditions of the query. Database statistics may be used in making these assessments during construction of the query-execution plan. For example, database statistics may be used by the optimizer to determine data demographics, such as attribute minimum and maximum values, data ranges of the database, estimated data block residency times, etc. The database system typically receives queries in a standard format, such as the Structured Query Language (SQL) put forth by the American National Standards Institute (ANSI).

Figure 2:
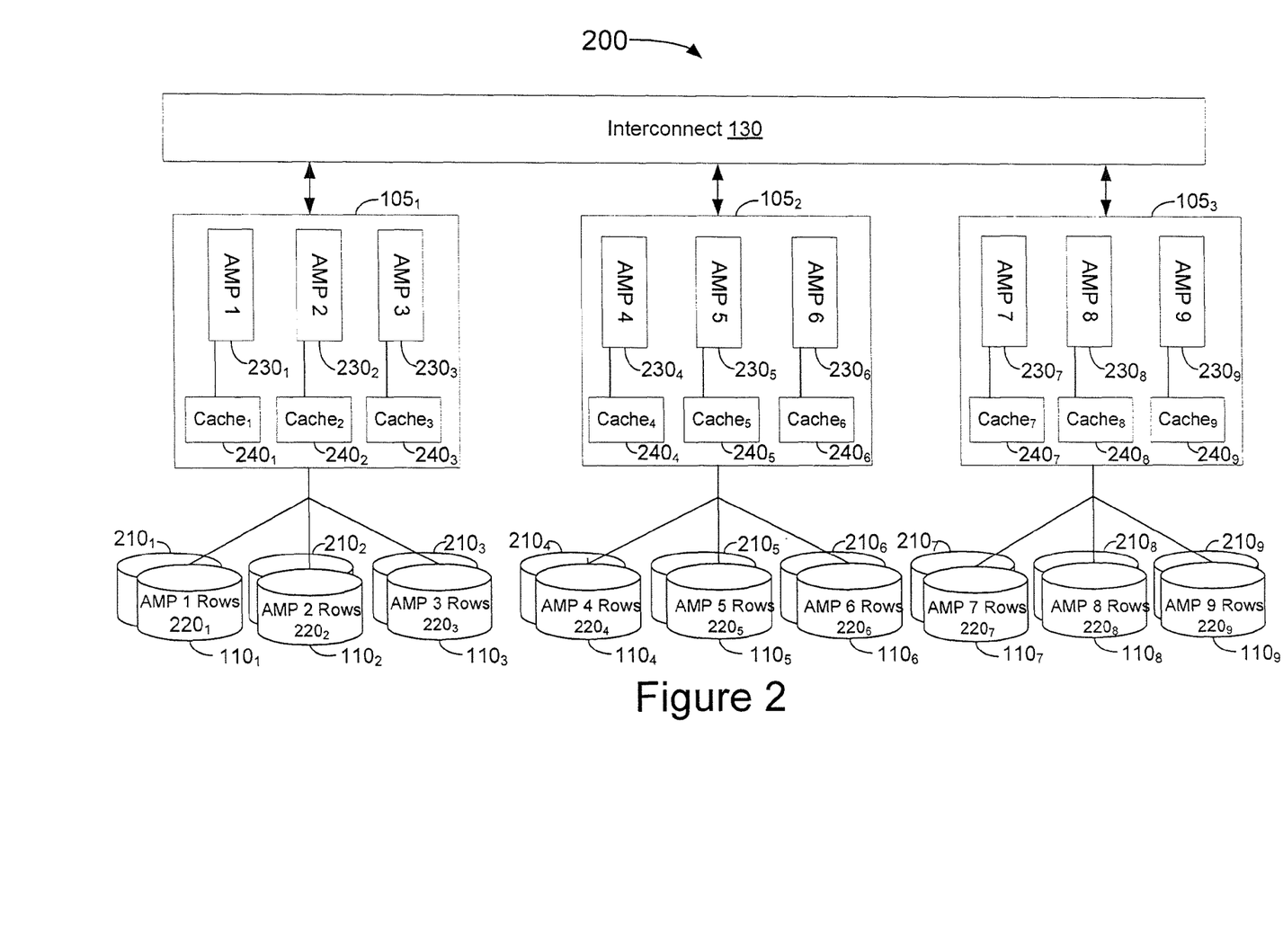
FIG. 2 is a diagrammatic representation of a massively parallel processing system configuration in which cache management mechanisms may be implemented in accordance with disclosed embodiments.

FIG. 2 is a diagrammatic representation of an MPP configuration 200 in which cache management mechanisms may be implemented in accordance with disclosed embodiments. Rows of tables may be distributed to multiple AMPs, e.g., AMPs $230_1$-$230_9$, hosted by processing modules $105_1$-$105_3$ such that each of the AMPs is allocated respective rows $220_1$-$220_9$. For example, table rows may be distributed in the MPP system via hash partitioning of the tables.

Each AMP $230_1$-$230_9$ may be allocated a respective cache $240_1$-$240_9$ memory, e.g., for temporary spool data storage, in addition to data storage facilities $110_1$-$110_9$. Further, the MPP system may feature a redundancy architecture to improve the system reliability. In the illustrative example, MPP configuration 200 features a redundant array of independent disks (RAID). To this end, each of data storage facilities $110_1$-$110_9$ has a corresponding RAID-1, or mirrored, data storage facility $210_1$-$210_9$ that each store the same data as respective data storage facilities $110_1$-$110_9$.

Figure 3:
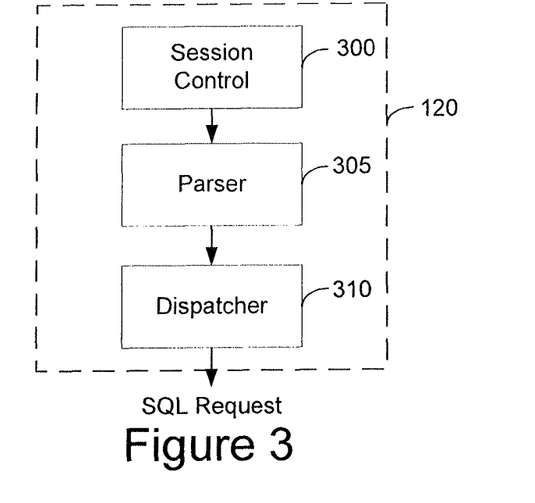
FIG. 3 is a diagrammatic representation of a parsing engine implemented in accordance with an embodiment.
Figure 4:
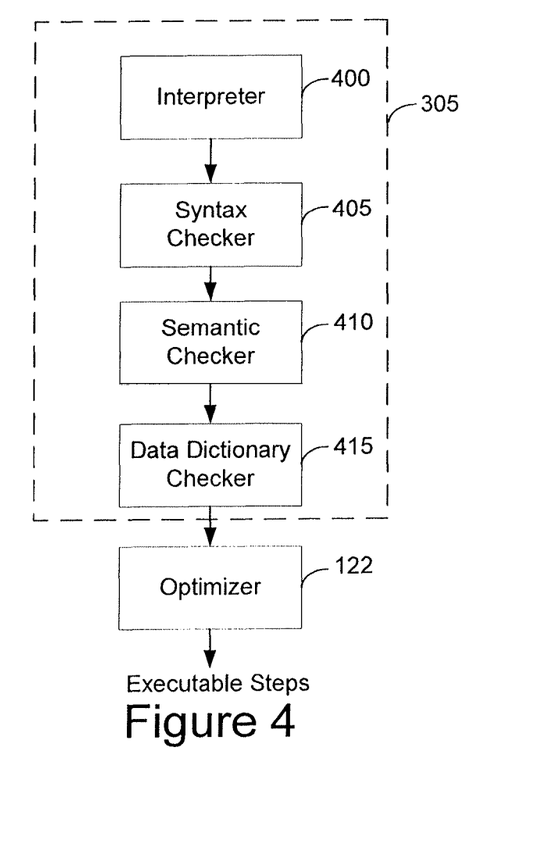
FIG. 4 depicts a diagrammatic representation of SQL processing by a parser in accordance with an embodiment.

In one example system, the parsing engine 120 is made up of three components: a session control 300, a parser 305, and a dispatcher 310 as shown in FIG. 3. The session control 300 provides the logon and logoff functions. It accepts a request for authorization to access the database, verifies it, and then either allows or disallows the access. Once the session control 300 allows a session to begin, a user may submit a SQL request that is routed to the parser 305. As illustrated in FIG. 4, the parser 305 interprets the SQL request (block 400), checks the request for correct SQL syntax (block 405), evaluates the request semantically (block 410), and consults a data dictionary to ensure that all of the objects specified in the SQL request exist and that the user has the authority to perform the request (block 415). Finally, the parser 305 runs the optimizer 122 that selects the least expensive plan to perform the request.

In accordance with disclosed embodiments, optimizer knowledge and workload management intelligence are applied to improve caching of spool data. Spool data is the intermediate result sets of a query that are needed in subsequent steps of a query plan. In contemporary implementations, spool or workspace data is cached in memory until which time the cache assigned to this task is exhausted. When that occurs, any new spool must be written to disk or, alternatively, must force existing cached spool data out to disk to make room for the new spool.

Disclosed caching mechanisms provide for an estimate of the residency time of each data block of a spool prior to the spool data being consumed and released. As referred to herein, the residency time comprises the storage time that a data block is required to be stored prior to the data block being consumed or otherwise exhausted. The estimated residency time is then used for existing and new spool data blocks to decide whether any new spool data block should be inserted in cache (possibly flushing one or more other cached spool data blocks) or if that spool data block should be written to disk. The residency calculation is made at the time of a new caching decision and provides the current estimate of residency time used in a subsequent residency estimate.

Two factors may be considered in determining the value of caching a spool data block—the size of the data block and the residency time. Small data blocks are more desirable to cache compared to larger data blocks since a reduction in the number of disk read and write operations, i.e., input/outputs (I/Os), may be realized. In a similar manner, spool data blocks with small residency times are more desirable to cache relative to spool data blocks with larger residency times. Thus, to maximize the productivity of cache, it is desirable to maximize the number of small, short residency time spool data blocks written to cache.

In accordance with an embodiment, the inverse of the size of a data block is used as a proxy measure that increases with the number of stored spool data blocks. In this manner, a residency/size metric, M, is calculated as the inverse of the data block size (S) multiplied by an estimated data block residency (R), e.g., according to the following:

$$M=1/(S*R).$$

The units of size, S, are workload, i.e., application dependent—for example byte, sectors, or kilobytes may be used. The units of time are arbitrary—microseconds or milliseconds for example. It is also possible to make a more accurate determination of the number of spool data blocks. This calculation may take into account, for example, the minimum and maximum sizes of a spool data blocks. In other implementations, the fragmentation of virtual address space, whether virtual remapping is supported to reclaim contiguous virtual space, and the cost of such remapping may be accommodated in a residency/size metric. Some systems support scatter-gather on virtual addresses thus eliminating this concern.

Figure 5:
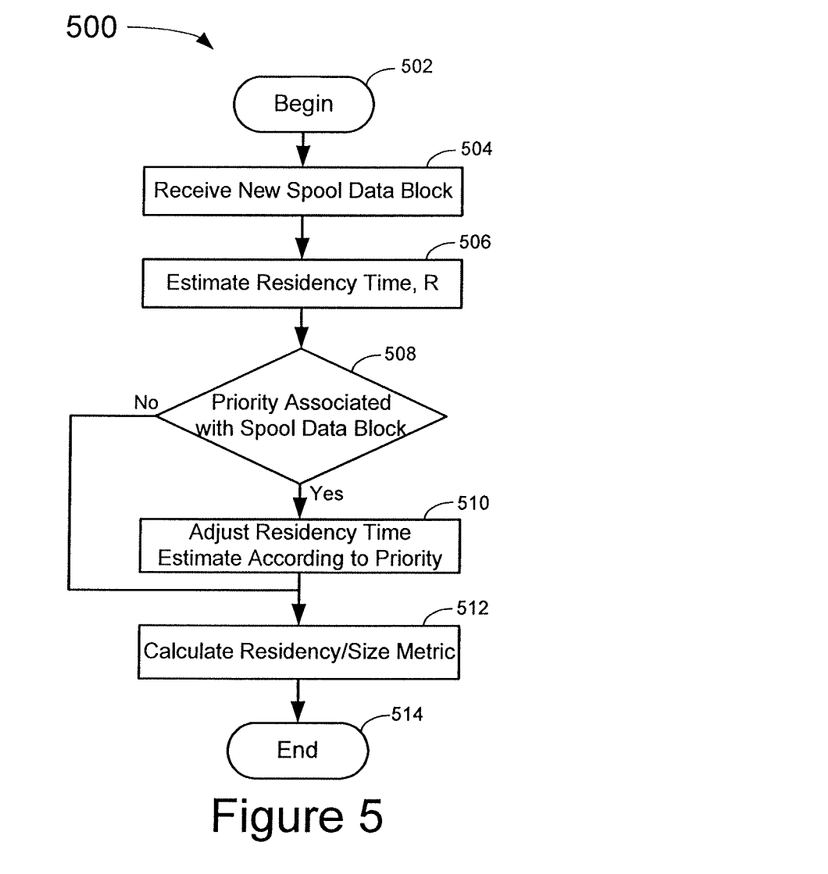
FIG. 5 is a flowchart that depicts a metric calculation subroutine that facilitates cache management in accordance with an embodiment.

FIG. 5 is a flowchart 500 that depicts a metric calculation subroutine that facilitates cache management in accordance with an embodiment. The processing steps of FIG. 5 may be implemented as computer-executable instructions tangibly embodied on a computer-readable medium executable by a processing system, such as one or more of the AMPs $210_1$-$210_9$ depicted in FIG. 2.

The metric calculation subroutine is invoked (step 502), and a new spool data block is received (step 504), e.g., on receipt or generation of a spool data block by an AMP. A residency time, R, is estimated for the spool data block (step 506). The estimated residency time for a spool data block may be determined in several ways. In a system not using workload management, a suitable measure may comprise, for example, an optimizer estimate of step times from when the spool is generated to when it is consumed and dropped. In a system featuring workload management, more sophisticated residency time estimates may be calculated.

The estimated residency time may optionally be adjusted in a system that features workload priority assignments that are associated with spool data. To this end, an evaluation may optionally be made to determine if a workload priority is associated with the spool data block (step 508). If no workload priority is associated with the spool data block, the metric calculation subroutine may proceed to calculate a data block metric (step 512). If a workload priority is associated with the spool data block, the estimated residency time, R, may be adjusted according to the associated workload priority (step 510). For example, assume the system allows for one of four workload priorities to be associated with a spool data block, such as a low, medium, high and rush priority designation, such that a spool with a rush priority designation is given processing precedence over a spool with a high priority and a high priority designation is given processing precedence over a spool with a medium or low priority. In such a system, the residency estimate of a spool data block with a low workload priority may be adjusted by a factor or function to increase the estimated residency time. Likewise, a spool with a rush or high priority may be adjusted downward to reduce the estimated residency.

After the residency time, R, is estimated according to step 506 and optionally adjusted according to step 510, the residency/size metric, M, may be calculated for the spool data block (step 512). As discussed above, the residency/size metric may be calculated as the inverse of the product of the spool data block size, S, and the estimated residency, R. In general, the residency/size metric may be calculated as a function of the data block size and/or the estimated residency time as well as other data block characteristics. The metric calculation subroutine cycle may then end (step 514).

In some implementations, a remaining residency time may be monitored, e.g., by the optimizer 122 and/or an AMP. For example, the time of a spool generation may be recorded and the difference between the current time and the generation time may be subtracted from the calculated estimated residency time, R, to monitor the estimated remaining residency time. If a system utilizes workload management, more sophisticated mechanisms may be implemented for estimating the remaining residency time of spool data. Further, additional measures of overall system resource utilization may be determined, and a measure of the contention for system resources may be used for calculating the remaining estimated residency time.

Figure 6:
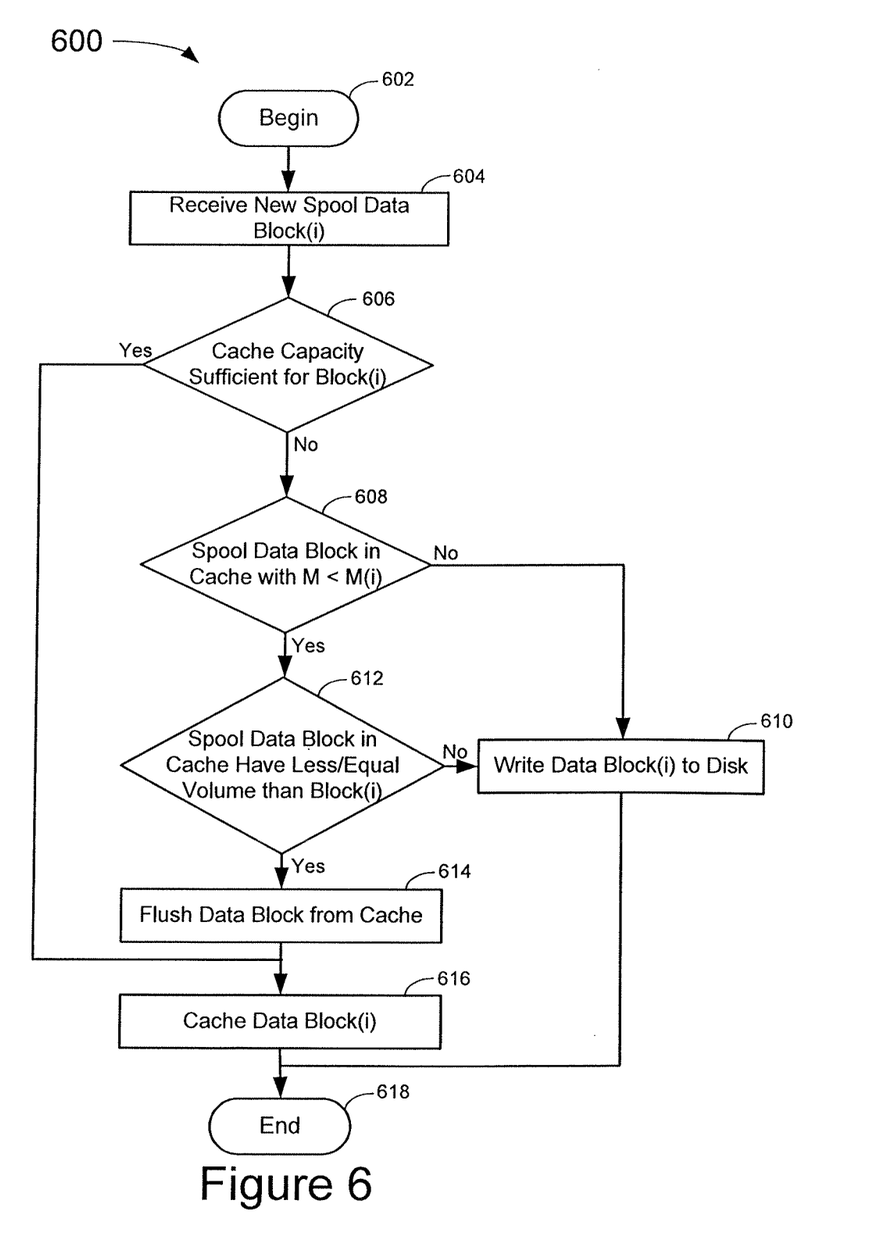
FIG. 6 is a flowchart that depicts processing of a cache management subroutine implemented in accordance with an embodiment.

FIG. 6 is a flowchart 600 that depicts processing of a cache management subroutine implemented in accordance with an embodiment. The processing steps of FIG. 6 may be implemented as computer-executable instructions tangibly embodied on a computer-readable medium executable by a processing system, such as one or more of the AMPs $210_1$-$210_9$ depicted in FIG. 2.

The cache management subroutine is invoked (step 602), and a new spool data block(i) is received or generated by a processing module (step 604). The processing module may then evaluate the cache allocated thereto to determine if there is sufficient cache capacity for storage of the spool data block(i) (step 606). If sufficient cache capacity is available, the processing module may then cache the spool data block(i) (step 616).

Returning again to step 606, if there is insufficient cache capacity for storage of the spool data block(i), the processing module may then evaluate the residency/size metric(s) of data block(s) currently cached to determine if there is any cached data block with a residency/size metric, M, that is less than the residency/size metric, M(i), of the spool data block(i) (step 608). If there is no cached data block with a residency/size metric less than the residency/size metric of the spool data block(i), the processing module may then proceed to write the spool data block(i) to disk (step 610). The cache management subroutine cycle may then end (step 618).

Returning again to step 608, in the event there is a cached data block with a residency/size metric, M, that is less than the residency/size metric, M(i), of the data block(i), the identified cached data block may then be evaluated to determine if the size of the cached data block is less or equal than the size of the data block(i) (step 612). If the cached data block does not have a size less or equal than that of the data block(i), the data block(i) may then be written to disk according to step 610. If the cached data block has a size less or equal than the data block(i), the cached data block may be flushed from the cache and written to disk (step 614). The spool data block(i) may then be written to the cache (step 616). In the event the flushed data block is smaller in size than the data block(i) written to cache, the mechanism advantageously provides for an increase in the available cache space. Further, in the event the residency time of the data block flushed from cache is greater than the residency time of the data block(i) written to cache, the cache is more efficiently utilized by replacing a cached data block with a larger residency with one featuring a smaller residency. The cache management subroutine cycle may then end according to step 618.

In accordance with another embodiment, multiple spool data blocks may be received or queued for generation, and a cache management subroutine may conjunctively evaluate the multiple data blocks for cache storage. For example, one or more data blocks may be evaluated for flushing one or more other cached data blocks to minimize the number of disk I/Os. For example, if multiple spool data blocks may be cached by flushing a lesser number of data blocks from the cache and writing the flushed data block(s) to disk, a reduction in the number of data blocks required to be written and subsequently read from the disk is advantageously realized.

Figure 7:
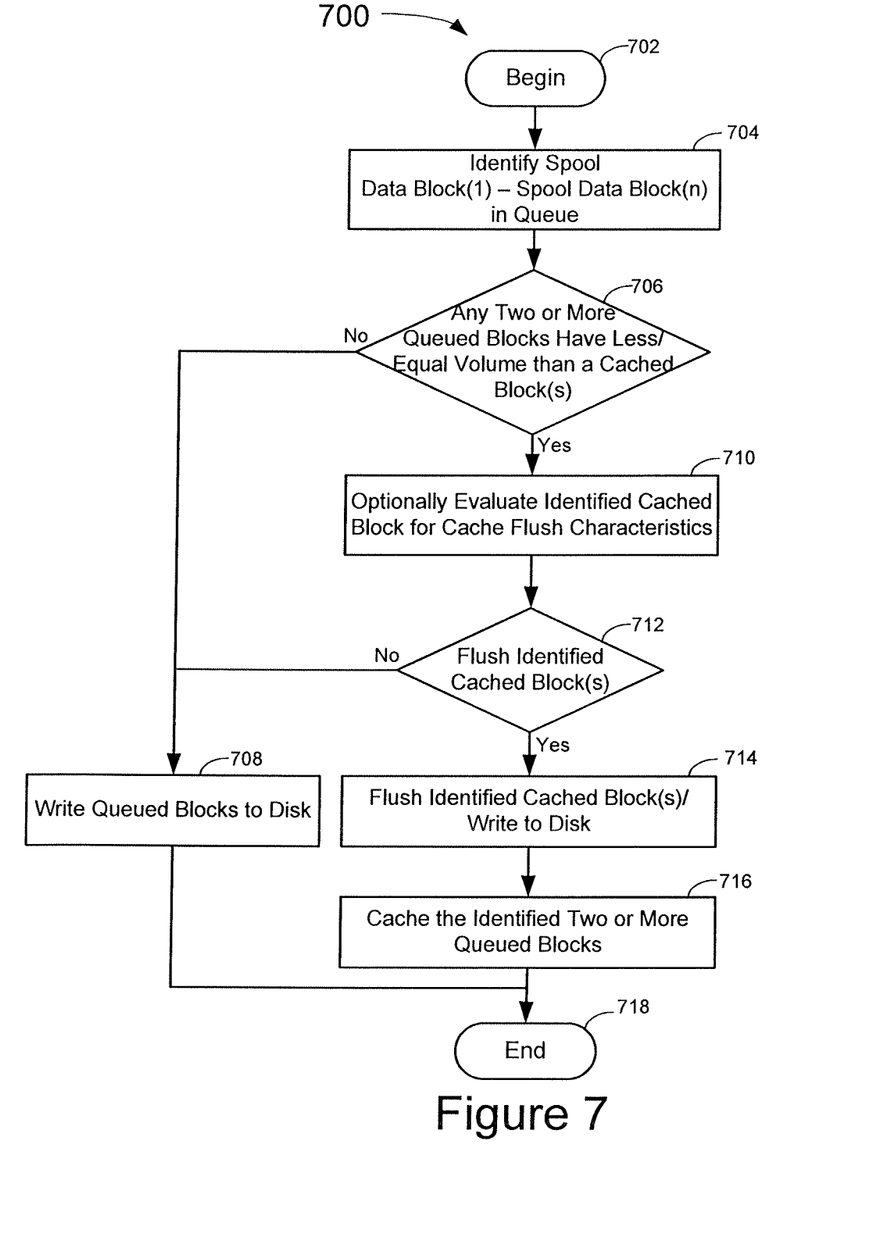
FIG. 7 is a flowchart that depicts processing of a cache management subroutine for evaluating one more data blocks for cache storage in accordance with an embodiment.

FIG. 7 is a flowchart 700 that depicts processing of a cache management subroutine for evaluating one more data blocks for cache storage in accordance with an embodiment. The processing steps of FIG. 7 may be implemented as computer-executable instructions tangibly embodied on a computer-readable medium executable by a processing system, such as one or more of the AMPs $210_1$-$210_9$ depicted in FIG. 2.

The cache management subroutine is invoked (step 702), and one or more spool data blocks (designated data block(1) through data block(n)) are received by a processing module or otherwise identified in a spool queue for generation (step 704). An evaluation may be made to determine if the sum of the size of any two or more of the data blocks (block1)-block(n)) identified for writing to cache is less or equal than the size of one cached data block or the sum of the size of or more currently cached data block(s) (step 706). The evaluation at step 706 may be made, for example, after determining the cache has insufficient capacity for storage of the two or more data blocks (block(1)-block(n)). If there are no currently queued data blocks that have lesser or equal volume than one or more cached data blocks, the queued data blocks (block(1)-block(n)) may then be written to disk (step 708). The cache management subroutine cycle may then end (step 718).

Returning again to step 706, if it is determined that the sum of the size of any two or more of the queued data blocks (block(1)-block(n)) identified for writing to cache is less or equal than the size of a currently cached data block(s), the currently cached data block(s) may optionally be evaluated with one or more cache flush characteristics (step 710). For example, evaluation of cache flush characteristics may include evaluating whether flushing the cached data block(s) will advantageously result in less disk I/Os than writing the queued data blocks to disk. In other implementations, an estimated remaining residency time of the cached data block(s) may be compared with a flush threshold time. If the estimated remaining residency time is less than the flush threshold time, flushing of the cached block(s) may be blocked.

An evaluation may then be made to determine if the identified cached data block(s) are to be flushed (step 712). If the currently cached data block(s) are not to be flushed, the queued data blocks may then be written to disk according to step 708. If it is determined that the currently cached data block(s) are to be flushed, the cached data block(s) are then flushed from cache and written to disk (step 714), and the identified spool data blocks (block(1)-block(n)) are written to cache (step 716). The cache management subroutine cycle may then end according to step 718.

It should be recognized that the entirety of the cache memory need not be assigned to spool. The spool cache may be a fixed percentage of cache, or may be a dynamic percentage of cache. If it is a dynamic percentage of cache, the techniques espoused in this invention may be used to determine the value of increasing spool, or the cost of decreasing spool and this may be used in conjunction with cost/benefit algorithms from other cache subsystems to determine the optimal dynamic assignment of overall cache to each cache subsystem.

As described, a method, computer-readable medium, and system that facilitates efficient use of cache memory in a massively parallel processing system are provided. The disclosed cache management mechanisms are effective for many workloads and are adaptable to various database usage scenarios without requiring detailed studies of the particular data demographics and workload. A residency time of a data block to be stored in cache memory or a disk drive is estimated. A metric is calculated for the data block as a function of the residency time. The metric may further be calculated as a function of the data block size. One or more data blocks stored in cache memory are evaluated by comparing a respective metric of the one or more data blocks with the metric of the data block to be stored. A determination is then made to either store the data block on the disk drive or flush the one or more data blocks from the cache memory and store the data block in the cache memory. In this manner, the cache memory may be more efficiently utilized by storing smaller data blocks with lesser residency times by flushing larger data blocks with significant residency times from the cache memory.

The flowcharts of FIGS. 5-7 depict process serialization to facilitate an understanding of disclosed embodiments and are not necessarily indicative of the serialization of the operations being performed. In various embodiments, the processing steps described in FIGS. 5-7 may be performed in varying order, and one or more depicted steps may be performed in parallel with other steps. Additionally, execution of some processing steps of FIGS. 5-7 may be excluded without departing from embodiments disclosed herein.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the disclosed embodiments may be implemented in software, hardware, firmware, or a combination thereof. The various elements of the system, either individually or in combination, may be implemented as a computer program product tangibly embodied in a machine-readable storage device for execution by a processing unit. Various steps of embodiments may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying aspects of the disclosed embodiments can be loaded onto a computer. The computer program is not limited to any particular embodiment, and may, for example, be implemented in an operating system, application program, foreground or background process, or any combination thereof, executing on a single processor or multiple processors. Additionally, various steps of embodiments may provide one or more data structures generated, produced, received, or otherwise implemented on a computer-readable medium, such as a memory.

Although disclosed embodiments have been illustrated in the accompanying drawings and described in the foregoing description, it will be understood that embodiments are not limited to the disclosed examples, but are capable of numerous rearrangements, modifications, and substitutions without departing from the disclosed embodiments as set forth and defined by the following claims. For example, the capabilities of the disclosed embodiments can be performed fully and/or partially by one or more of the blocks, modules, processors or memories. Also, these capabilities may be performed in the current manner or in a distributed manner and on, or via, any device able to provide and/or receive information. Still further, although depicted in a particular manner, a greater or lesser number of modules and connections can be utilized with the present disclosure in order to accomplish embodiments, to provide additional known features to present embodiments, and/or to make disclosed embodiments more efficient. Also, the information sent between various modules can be sent between the modules via at least one of a data network, an Internet Protocol network, a wireless source, and a wired source and via a plurality of protocols.

What is claimed is:

1. A method, implemented by at least partly by a device, for providing cache management in a processing system, comprising:
    estimating a residency time of a first data block that is not stored in the processing system but is to be stored in the processing system, wherein the residency time is determined at least partly based on an estimation of time required for the first data block to be resident in a cache memory of the processing system when the first data block is not stored in the cache memory;
    calculating a metric for the first data block at least as a function of the residency time of the first data block and a workload priority associated with the first data block;
    evaluating one or more data blocks in the cache memory by comparing a respective metric of the one or more data blocks with the metric of the first data block; and
    responsive to evaluating the one or more data blocks, determining to store the first data block in only one of the cache memory and a disk drive.

2. The method of claim 1, wherein calculating a metric further comprises calculating the metric as a function of the residency time and a size of the first data block.

3. The method of claim 1, wherein determining to store comprises determining to store the first data block in the cache memory, the method further comprising:
    identifying at least a second data block of the one or more data blocks that has an estimated residency time that is greater than the residency time of the first data block.

4. The method of claim 3, further comprising:
    flushing the second data block from the cache memory; and
    writing the second data block to the disk drive.

5. The method of claim 1, wherein determining to store comprises determining to store the first data block on the disk drive, the method further comprising failing to identify at least a second data block of the one or more data blocks that has an estimated residency time that is greater than the residency time of the first data block.

6. The method of claim 1, wherein estimating a residency time of a first data block comprises estimating a residency time of a plurality of data blocks that are to be stored in a parallel processing system, the method further comprising:
    identifying a first set of data blocks comprising one or more data blocks in the cache;
    flushing the first set of data blocks from the cache memory; and
    writing a second set of data blocks of the plurality of data blocks to the cache memory.

7. The method of claim 6, further comprising determining, prior to flushing the first set of data blocks from the cache memory, that writing and reading the first set of data blocks to the disk drive requires less disk write and read operations than writing and reading the second set of data blocks to the disk drive.

8. The method of claim 1, further comprising performing a comparison of a size of the one or more data blocks in the cache memory with the size of the first data block, and wherein determining to store the first data block in only one of the cache memory and a disk drive is based, at least in part, on results of the comparison.

9. A non-transitory computer-readable storage medium storing at least computer-executable instructions for providing cache management in a system, the computer-executable instructions, when executed, cause the system to:
    estimate a residency time of a first data block that is to be stored in the System;
    calculate a metric for the first data block as a function of the residency time of the first data block and a workload priority associated with the first data block;
    evaluate one or more data blocks in a cache memory by comparing a respective metric of the one or more data blocks with the metric of the first data block; and
    responsive to evaluating the one or more data blocks, determine to store the first data block in one of the cache memory and a disk drive.

10. The non-transitory computer-readable medium of claim 9, wherein the instructions that calculate a metric further comprise instructions that calculate the metric as a function of the residency time and a size of the first data block.

11. The non-transitory computer-readable medium of claim 9, wherein the instructions that determine to store comprise instructions that determine to store the first data block in the cache memory, the computer-readable medium further comprising instructions that identify at least a second data block of the one or more data blocks that has an estimated residency time that is greater than the residency time of the first data block.

12. The non-transitory computer-readable medium of claim 11, further comprising instructions that when executed, cause the system to: flush the second data block from the cache; and write the second data block to the disk drive.

13. The non-transitory computer-readable medium of claim 9, wherein the instructions that determine to store comprise instructions that determine to store the first data block on the disk drive, the computer-readable medium further comprising instructions that, when executed, cause the processing system to fail to identify at least a second data block of the one or more data blocks that has an estimated residency time that is greater than the residency time of the first data block.

14. The non-transitory computer-readable medium of claim 9, wherein the instructions that estimate a residency time of a first data block comprise instructions that estimate a residency time of a plurality of data blocks that are to be stored in the system, the computer-readable medium further comprising instructions that when executed, cause the system to:
    identify a first set of data blocks comprising one or more data blocks in the cache;
    flush the first set of data blocks from the cache memory; and
    write a second set of data blocks of the plurality of data blocks to the cache memory.

15. The non-transitory computer-readable medium of claim 14, further comprising instructions that when executed, cause the processing system to determine, prior to flushing the first set of data blocks from the cache memory, that writing and reading the first set of data blocks to the disk drive requires less disk write and read operations than writing and reading the second set of data blocks to the disk drive.

16. The non-transitory computer-readable medium of claim 9, further comprising instructions that, when executed, cause the system to perform a comparison of a size of the one or more data blocks in the cache memory with the size of the first data block, and wherein the instructions that determine to store the first data block in one of the cache memory and a disk drive perform the determination, at least in part, on results of the comparison.

17. A device comprising one or more processors adapted to:
estimate a residency time of a first data block that is not stored in the processing system but is to be stored in the processing system, wherein the residency time is determined at least partly based on an estimation of time required for the first data block to be resident in a cache memory of the processing system when the first data block is not stored in the cache memory;
calculate a metric for the first data block at least as a function of the residency time of the first data block and a workload priority associated with the first data block;
evaluate one or more data blocks in the cache memory by comparing a respective metric of the one or more data blocks with the metric of the first data block; and
responsive to evaluating the one or more data blocks, determine to store the first data block in only one of the cache memory and a disk drive.

18. The device of claim 17, wherein calculating a metric further comprises calculating the metric as a function of the residency time and a size of the first data block.

19. The device of claim 18, wherein determining to store comprises determining to store the first data block in the cache memory, the method further comprising identifying at least a second data block of the one or more data blocks that has an estimated residency time that is greater than the residency time of the first data block.

* * * * *